(12) United States Patent
Nagata

(10) Patent No.: US 11,587,348 B2
(45) Date of Patent: Feb. 21, 2023

(54) DOCUMENT CLASSIFICATION SYSTEM AND NON-TRANSITORY COMPUTER READABLE RECORDING MEDIUM STORING DOCUMENT CLASSIFICATION PROGRAM

(71) Applicant: KYOCERA Document Solutions Inc., Osaka (JP)

(72) Inventor: Noriyuki Nagata, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/905,978

(22) Filed: Jun. 19, 2020

(65) Prior Publication Data
US 2020/0410230 A1 Dec. 31, 2020

(30) Foreign Application Priority Data
Jun. 26, 2019 (JP) .............................. JP2019-118742

(51) Int. Cl.
| | | |
|---|---|---|
| G06K 9/00 | (2022.01) | |
| G06V 30/413 | (2022.01) | |
| G06V 10/40 | (2022.01) | |
| G06V 30/10 | (2022.01) | |

(52) U.S. Cl.
CPC ............ *G06V 30/413* (2022.01); *G06V 10/40* (2022.01); *G06V 30/10* (2022.01)

(58) Field of Classification Search
None
See application file for complete search history.

(56) References Cited

U.S. PATENT DOCUMENTS

| | | | |
|---|---|---|---|
| 10,963,692 B1* | 3/2021 | Corcoran | G06N 5/046 |
| 11,494,051 B1* | 11/2022 | Davis | G06F 3/04886 |
| 2010/0142832 A1* | 6/2010 | Nafarieh | G06K 9/00456 |
| | | | 382/218 |
| 2012/0229872 A1* | 9/2012 | Dolev | G06V 10/56 |
| | | | 358/448 |
| 2014/0105449 A1* | 4/2014 | Caton | G06T 1/0021 |
| | | | 382/100 |
| 2015/0081681 A1* | 3/2015 | Vohra | G06F 16/248 |
| | | | 707/723 |
| 2018/0032842 A1* | 2/2018 | Yellapragada | G06K 9/6267 |
| 2019/0138804 A1* | 5/2019 | Suzuki | G06K 9/00442 |
| 2019/0392196 A1* | 12/2019 | Sagonas | G06N 3/04 |
| 2020/0065576 A1* | 2/2020 | Padmanaban | G06V 30/412 |
| 2020/0394396 A1* | 12/2020 | Yanamandra | G06V 30/416 |

FOREIGN PATENT DOCUMENTS

JP      2004-289500      10/2004

* cited by examiner

*Primary Examiner* — Oneal R Mistry
(74) *Attorney, Agent, or Firm* — Lex IP Meister, PLLC

(57) ABSTRACT

A document classification system uses an image file as a file of an image serving as a model for classifying a document to classify, by machine learning, an image read from a form as a document by a scanner of an image forming apparatus, and reports a classification failure image as an image of the document when the document is unsuccessfully classified.

7 Claims, 9 Drawing Sheets

FIG. 3

24f IMAGE FILE

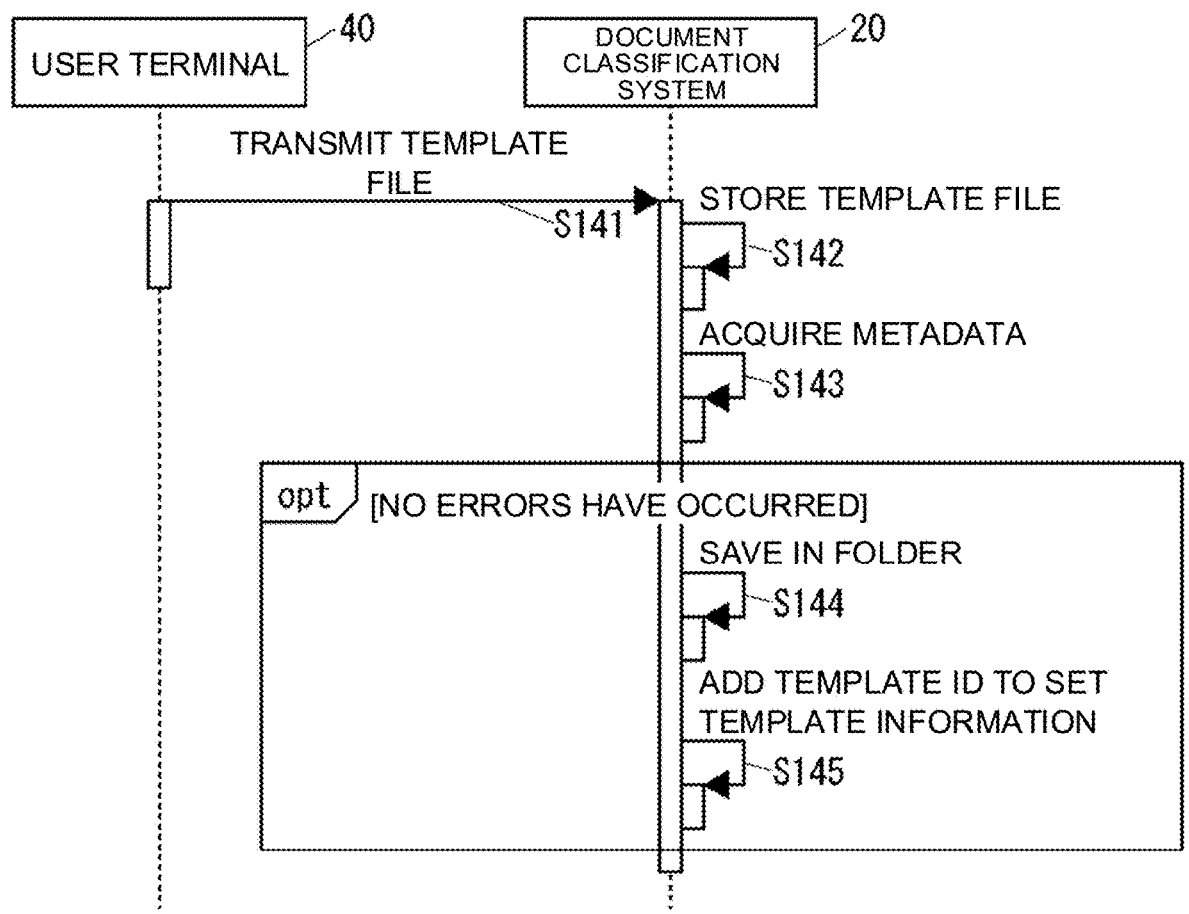

DOCUMENT CLASSIFICATION SYSTEM AND NON-TRANSITORY COMPUTER READABLE RECORDING MEDIUM STORING DOCUMENT CLASSIFICATION PROGRAM

INCORPORATION BY REFERENCE

This application is based upon, and claims the benefit of priority from, corresponding Japanese Patent Application No. 2019-118742 filed in the Japan Patent Office on Jun. 26, 2019, the entire contents of which are incorporated herein by reference.

BACKGROUND

Field of the Invention

The present disclosure relates to a document classification system to classify documents and a non-transitory computer readable recording medium storing a document classification program.

Description of Related Art

In a conventional technology, an apparatus is known that reads an image from a document with a scanner and transmits the image to another apparatus.

SUMMARY

A document classification system according to the present disclosure includes a document classifier that uses an image file, which is a file of an image serving as a model for classifying a document, to classify the document by machine learning, and a classification failure image reporter that reports a classification failure image, which is an image of the document when the document is unsuccessfully classified by the document classifier.

The document classification system according to the present disclosure may further include a template acceptor that accepts a template file including the image file and a data file, which contains an item of metadata of an image and a region of the metadata in the image. In that case, the document classifier uses the image file included in the template file to classify the document by machine learning, and uses the data file included in the template file to acquire the metadata from an image of the document by optical character recognition. The classification failure image reporter reports a screen, on which the classification failure image is shown in order to accept designation of the region in the classification failure image. The template acceptor accepts the template file including the data file, which contains the region designated on the screen and the item corresponding to the region, and the image file, which is a file of the classification failure image shown on the screen.

In the document classification system of the present disclosure, the document classifier may execute a workflow, on which the template file is set. In that case, the document classifier uses the image file included in the template file set on the workflow to classify the document by machine learning, and uses the data file included in the template file to acquire the metadata from the image of the document by optical character recognition. The classification failure image reporter specifies, based on text obtained from the classification failure image by optical character recognition and the item contained in the data file included in the template file set on the workflow, a candidate for the region corresponding to the item in the classification failure image and shows the candidate specified on the screen.

When the template file is accepted by the template acceptor, the document classifier in the document classification system of the present disclosure may use the data file included in the template file to automatically acquire the metadata from the classification failure image by optical character recognition.

When the template file is accepted by the template acceptor, the document classifier in the document classification system of the present disclosure may use the data file included in the template file to automatically acquire the metadata from the classification failure image by optical character recognition and, when the metadata is successfully acquired, automatically set the template file on the workflow.

A non-transitory computer readable recording medium according to the present disclosure is a recording medium storing a document classification program, the document classification program causing a computer to implement a document classifier that uses an image file, which is a file of an image serving as a model for classifying a document, to classify the document by machine learning, and a classification failure image reporter that reports a classification failure image, which is an image of the document when the document is unsuccessfully classified by the document classifier.

BRIEF DESCRIPTION OF THE DRAWINGS

FIG. 3 is a diagram illustrating an example of an image file included in a template file in FIG. 2;

FIG. 9 is a sequence diagram of operations of the system illustrated in FIG. 1 when a template file is added.

DETAILED DESCRIPTION

The following description is made on an embodiment of the present disclosure with reference to the drawings.

First of all, the configuration of a system according to an embodiment of the present disclosure is described.

Figure 1:
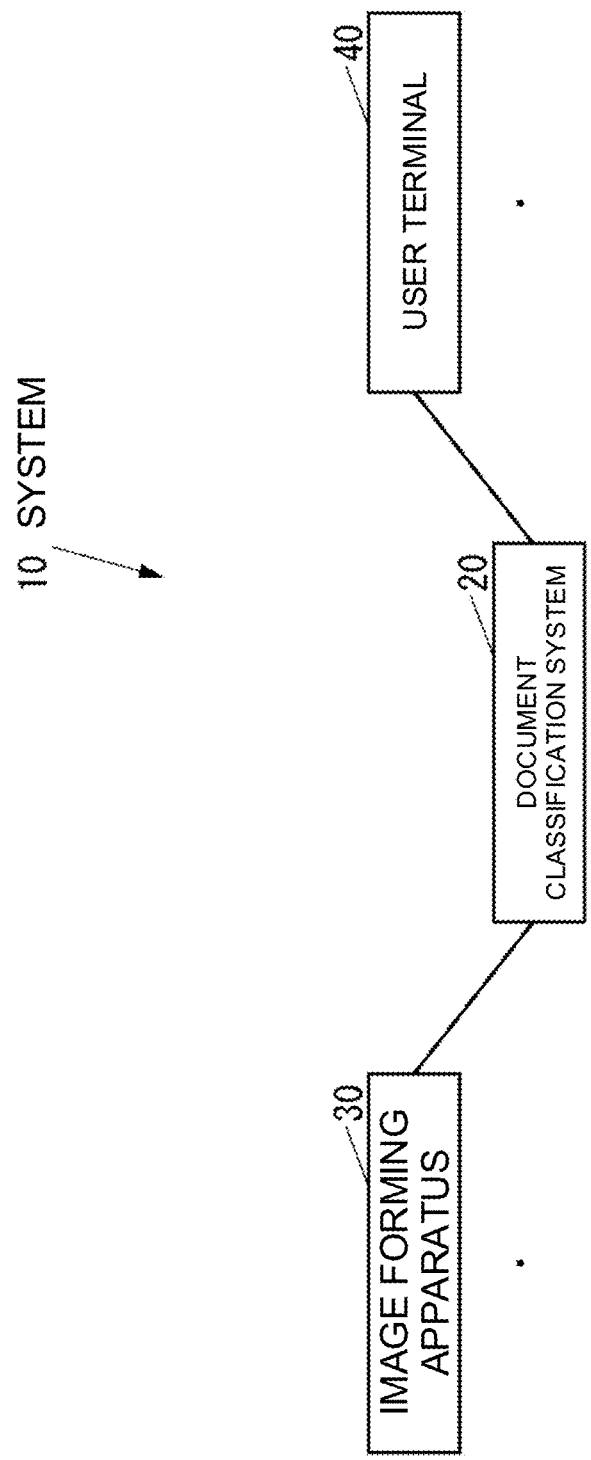
FIG. 1 is a block diagram illustrating a system according to an embodiment of the present disclosure.

FIG. 1 is a block diagram illustrating the system according to the embodiment.

As illustrated in FIG. 1, a system 10 includes a document classification system 20 to classify documents. The document classification system 20 may be constructed of one computer or multiple computers.

The system 10 includes an image forming apparatus 30 provided with a scanner as a reading device to read an image from an original. Apart from the image forming apparatus 30, the system 10 can include at least one image forming apparatus provided with a scanner as a reading device to read an image from an original. The image forming apparatus 30 in the system 10 includes a multifunction peripheral (MFP) or a dedicated scanner, for instance.

The system 10 includes a user terminal 40 to be used by an operator. Apart from the user terminal 40, the system can include at least one user terminal to be used by an operator. The user terminal 40 in the system 10 includes a computer such as a personal computer (PC), for instance.

The document classification system 20 and the image forming apparatus 30 in the system 10 are capable of communicating with each other over a network, such as a local area network (LAN) and the Internet, or without any networks but immediately through a wired or wireless connection. Similarly, the document classification system 20 and the user terminal 40 in the system 10 are capable of communicating with each other over a network, such as a LAN and the Internet, or without any networks but immediately through a wired or wireless connection.

Figure 2:
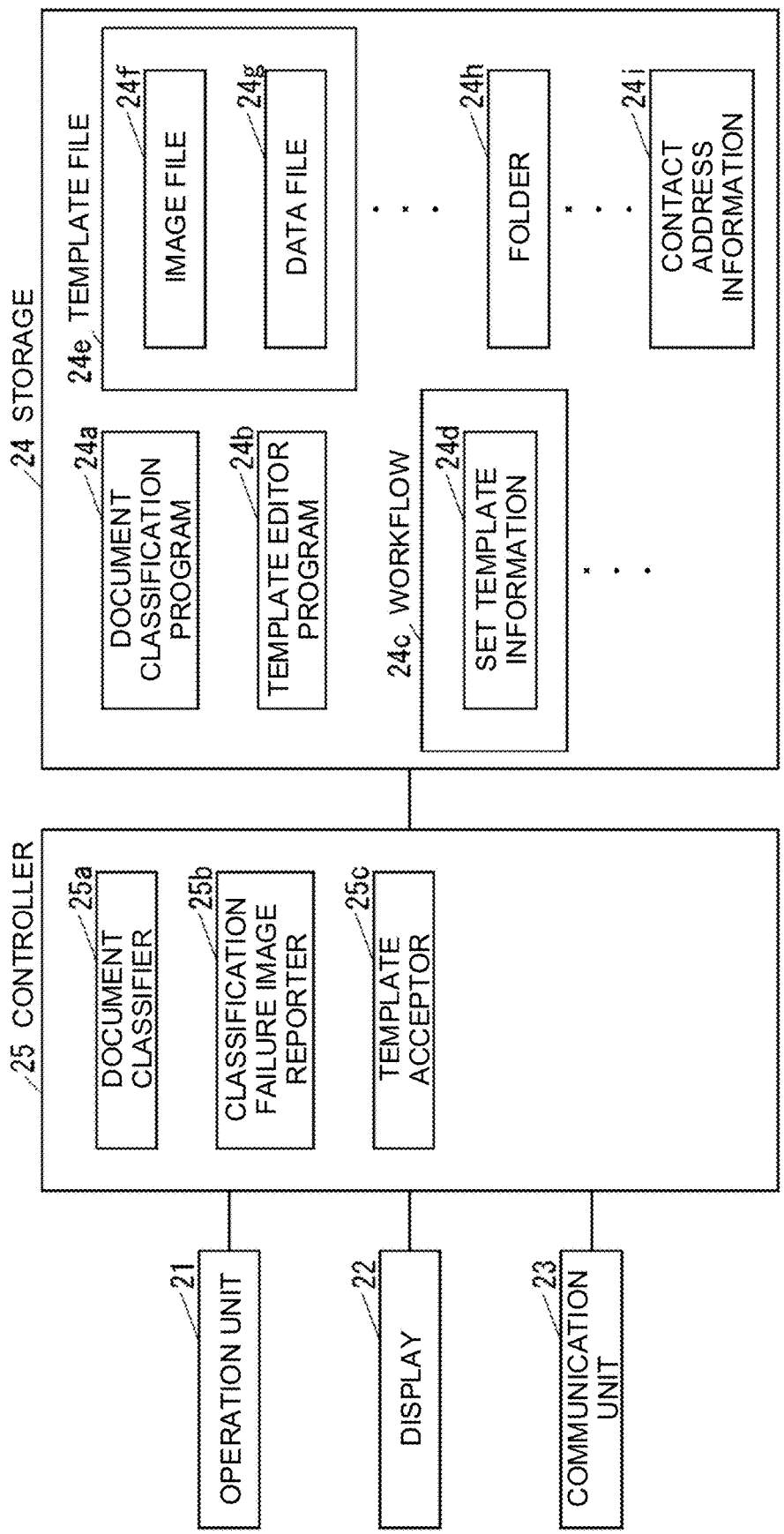
FIG. 2 is a block diagram illustrating a document classification system in FIG. 1, which is constructed of one computer in the illustrated example.

FIG. 2 is a block diagram illustrating the document classification system 20, which is constructed of one computer in the illustrated example.

As illustrated in FIG. 2, the document classification system 20 includes an operation unit 21 as an operation device such as a keyboard or a mouse, through which various operations are input, a display 22 as a displaying device such as a liquid crystal display (LCD) for displaying various types of information, a communication unit 23 as a communication device for communicating with external apparatuses over a network, such as a LAN and the Internet, or with no networks but directly through a wired or wireless connection, a storage 24 as a non-volatile storage device such as a semiconductor memory or a hard disk drive (HDD) for storing various types of information, and a controller 25 that controls the document classification system 20 as a whole.

The storage 24 stores a document classification program 24a for classifying documents and a template editor program 24b for realizing a template editor, which is a web application for creating a template file (to be described later) set on a workflow (to be described later) for classifying documents. The document classification program 24a and the template editor program 24b may each be installed in the document classification system 20 during the manufacture of the document classification system 20, or may each be additionally installed in the document classification system 20 from an external storage medium, such as a compact disc (CD), a digital versatile disc (DVD) or a universal serial bus (USB) memory, or may each be additionally installed in the document classification system 20 over a network.

The storage 24 stores a workflow 24c of image processing. The workflow 24c includes set template information 24d that contains identification information (hereinafter referred to as "template ID") of a template file (to be described later) set on the workflow 24c. The set template information 24d contains a plurality of template files. Apart from the workflow 24c, the storage 24 can store at least one workflow of image processing. The workflow 24c stored in the storage 24 is assigned identification information (hereinafter referred to as "workflow ID") for the discrimination from other workflows.

The storage 24 stores a template file 24e that is to be set on a workflow. Apart from the template file 24e, the storage 24 stores at least one template file that is to be set on a workflow.

Figure 3:
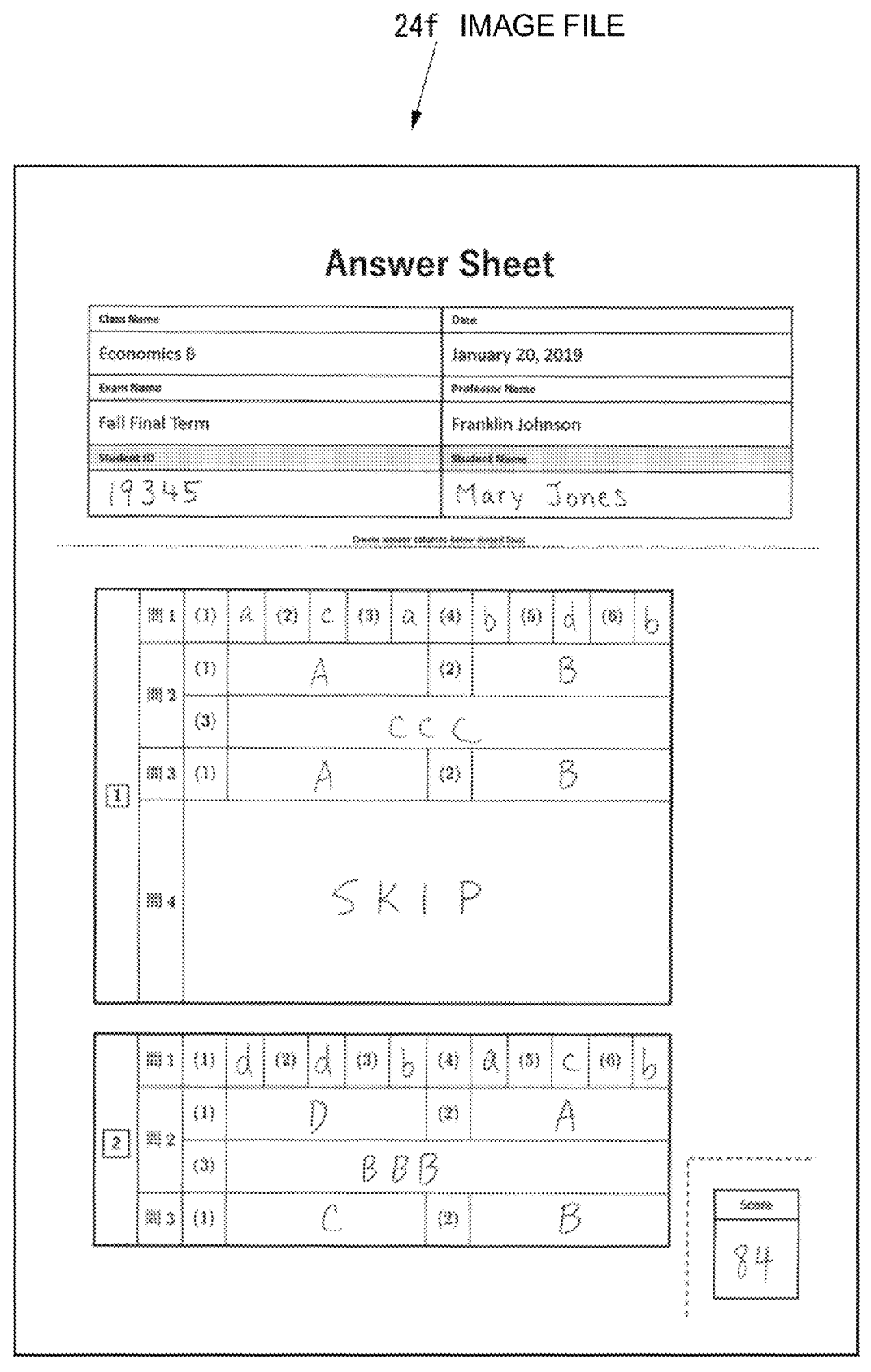

FIG. 3 is a diagram illustrating an example of an image file 24f included in the template file 24e.

As illustrated in FIG. 2, the template file 24e is a compressed file that includes the image file 24f illustrated in FIG. 3, for instance, which may be a tagged image file format (TIFF) file, and a data file 24g, which may be a file in extensible markup language (XML) format.

The image file 24f is a file of an image serving as a model for classifying a document.

The data file 24g is a file that contains an item of metadata of an image and a region of the metadata in the image, and is used to acquire the metadata of the image from the image. The data file 24g includes anchor information that is setting information of an anchor of, for instance, a fixed character string or a fixed image serving as a guide to acquiring the metadata from the image, and metadata information that is setting information of the metadata. As an example, the anchor information includes coordinate information containing the coordinates of a position in the image, which position is specified with respect to an anchor region that is, for instance, a rectangular region surrounding the anchor, and is the leftmost position on the upper edge of the anchor region, for instance, and rectangle information containing the size of a rectangular shape of the anchor region surrounding the anchor in the image. As an example, the metadata information includes coordinate information containing the coordinates of a position in the image, which position is specified with respect to a region of metadata that is, for instance, a rectangular region surrounding the metadata, and is the leftmost position on the upper edge of the region of metadata, for instance, rectangle information containing the size of a rectangular shape of the region of metadata surrounding the metadata in the image, and property information containing attributes of the metadata, such as date, figure, decimal point, handwriting, and mark. The coordinate information containing the coordinates of a position specified with respect to the region of metadata in the image may contain coordinates relative to an anchor if the anchor is present.

As illustrated in FIG. 2, the storage 24 may store a folder 24h for saving a document. Apart from the folder 24h, the storage 24 can store at least one folder for saving a document.

The storage 24 stores contact address information 24i containing a contact address, to which various types of information are to be sent. The contact address contained in the contact address information 24i is an electronic mail address, for instance.

The controller 25 includes, for instance, a central processing unit (CPU), a read-only memory (ROM) storing programs and various data, and a random access memory (RAM) that is a memory used as a workspace for the CPU of the controller 25. The CPU of the controller 25 executes a program stored in the storage 24 or the ROM of the controller 25.

The controller 25 executes the document classification program 24a so as to implement a document classifier 25a that uses an image file to classify a document by machine learning, a classification failure image reporter 25b that reports a classification failure image as an image of the document when the document is unsuccessfully classified by the document classifier 25a, and a template acceptor 25c that accepts a template file.

Figure 4:
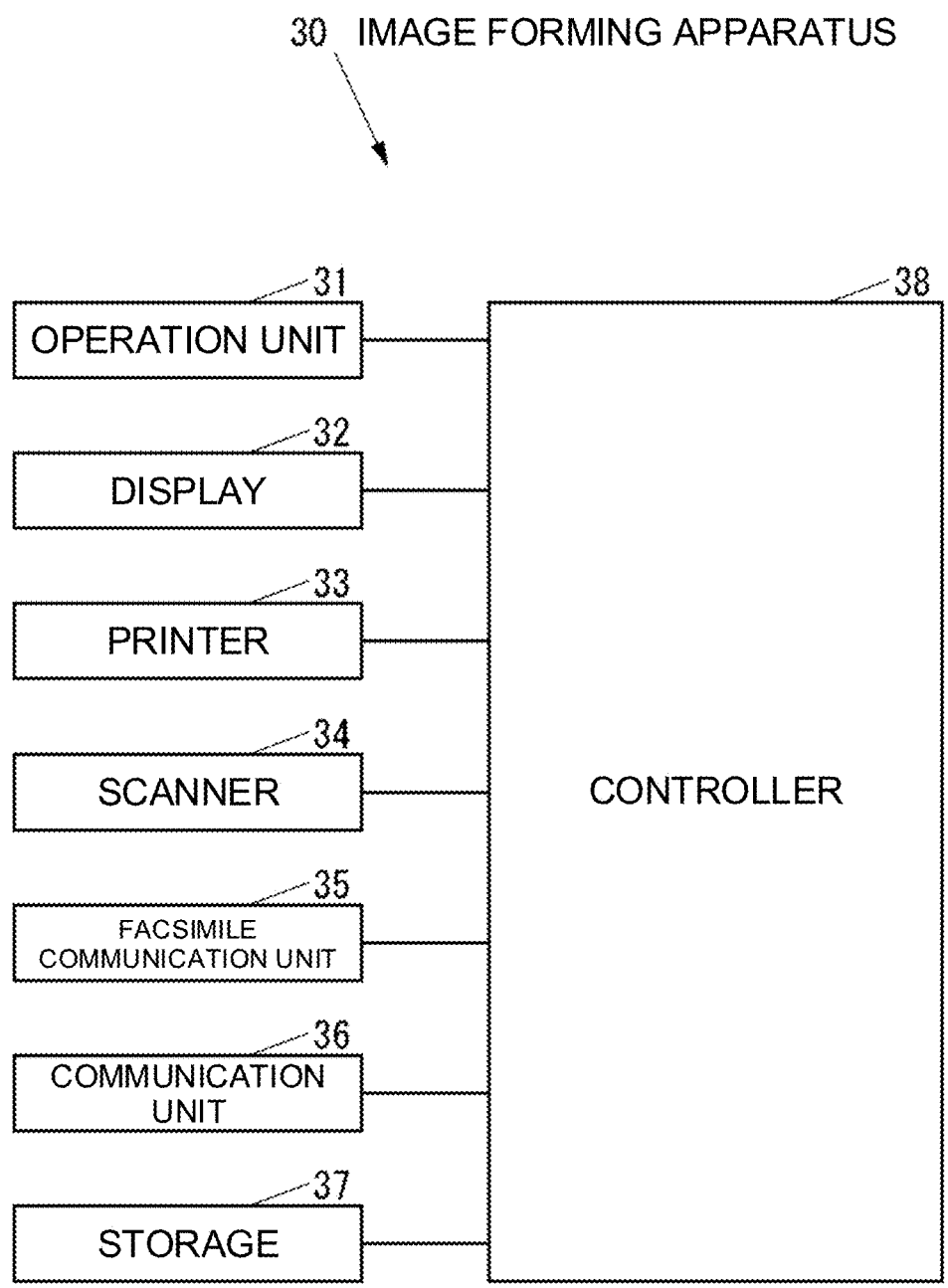
FIG. 4 is a block diagram illustrating an image forming apparatus in FIG. 1 as a multifunction peripheral (MFP)

FIG. 4 is a block diagram illustrating the image forming apparatus 30 as an MFP.

The image forming apparatus 30 as illustrated in FIG. 4 includes an operation unit 31 as an operation device such as a button, through which various operations are input, a display 32 as a displaying device such as an LCD for displaying various types of information, a printer 33 as a printing device for printing an image on a recording medium such as a sheet of paper, a scanner 34 as a reading device for reading an image from an original, a facsimile communication unit 35 as a faxing device that performs facsimile communications with external facsimile machines (not illustrated) through a communications line such as a public telephone line, a communication unit 36 as a communication device for communicating with external apparatuses over a network, such as a LAN and the Internet, or with no networks but directly through a wired or wireless connection, a storage 37 as a non-volatile storage device such as a semiconductor memory or an HDD for storing various types of information, and a controller 38 that controls the image forming apparatus 30 as a whole.

The controller 38 includes, for instance, a CPU, a ROM storing programs and various data, and a RAM that is a memory used as a workspace for the CPU of the controller 38. The CPU of the controller 38 executes a program stored in the storage 37 or the ROM of the controller 38.

Figure 5:
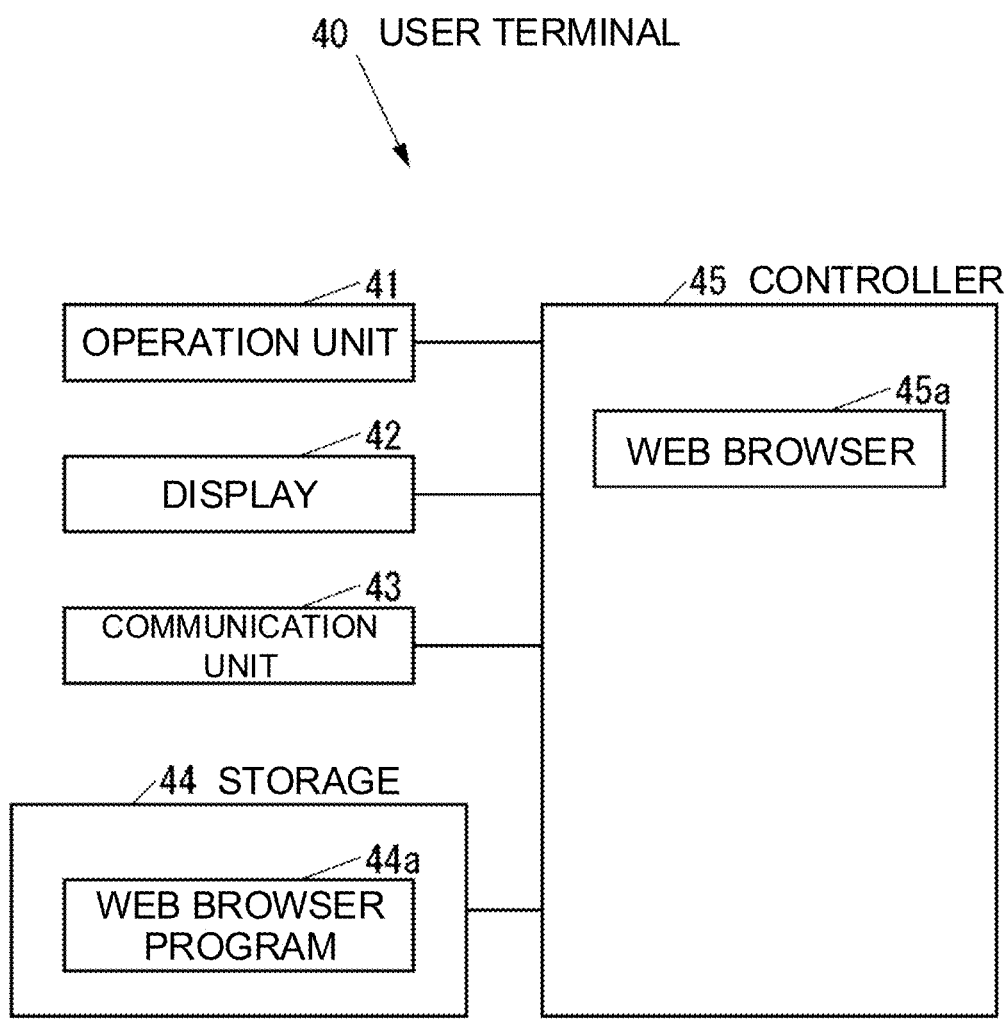
FIG. 5 is a block diagram illustrating a user terminal in FIG. 1.

FIG. 5 is a block diagram illustrating the user terminal 40.

As illustrated in FIG. 5, the user terminal 40 includes an operation unit 41 as an operation device such as a keyboard or a mouse, through which various operations are input, a display 42 as a displaying device such as an LCD for displaying various types of information, a communication unit 43 as a communication device for communicating with external apparatuses over a network, such as a LAN and the Internet, or with no networks but directly through a wired or wireless connection, a storage 44 as a non-volatile storage device such as a semiconductor memory or a HDD for storing various types of information, and a controller 45 that controls the user terminal 40 as a whole.

The storage 44 stores a web browser program 44a for realizing a web browser. The web browser program 44a may be installed in the user terminal 40 during the manufacture of the user terminal 40, or may additionally be installed in the user terminal 40 from an external storage medium such as a CD, a DVD or a USB memory, or may additionally be installed in the user terminal 40 over a network.

The controller 45 includes, for instance, a CPU, a ROM storing programs and various data, and a RAM that is a memory used as a workspace for the CPU of the controller 45. The CPU of the controller 45 executes a program stored in the storage 44 or the ROM of the controller 45.

The controller 45 executes the web browser program 44a to implement a web browser 45a.

Next, operations of the system 10 are described.

Description is initially made on the operations of the system 10 when document classification processing for classifying a document is performed in the document classification system 20.

Figure 6:
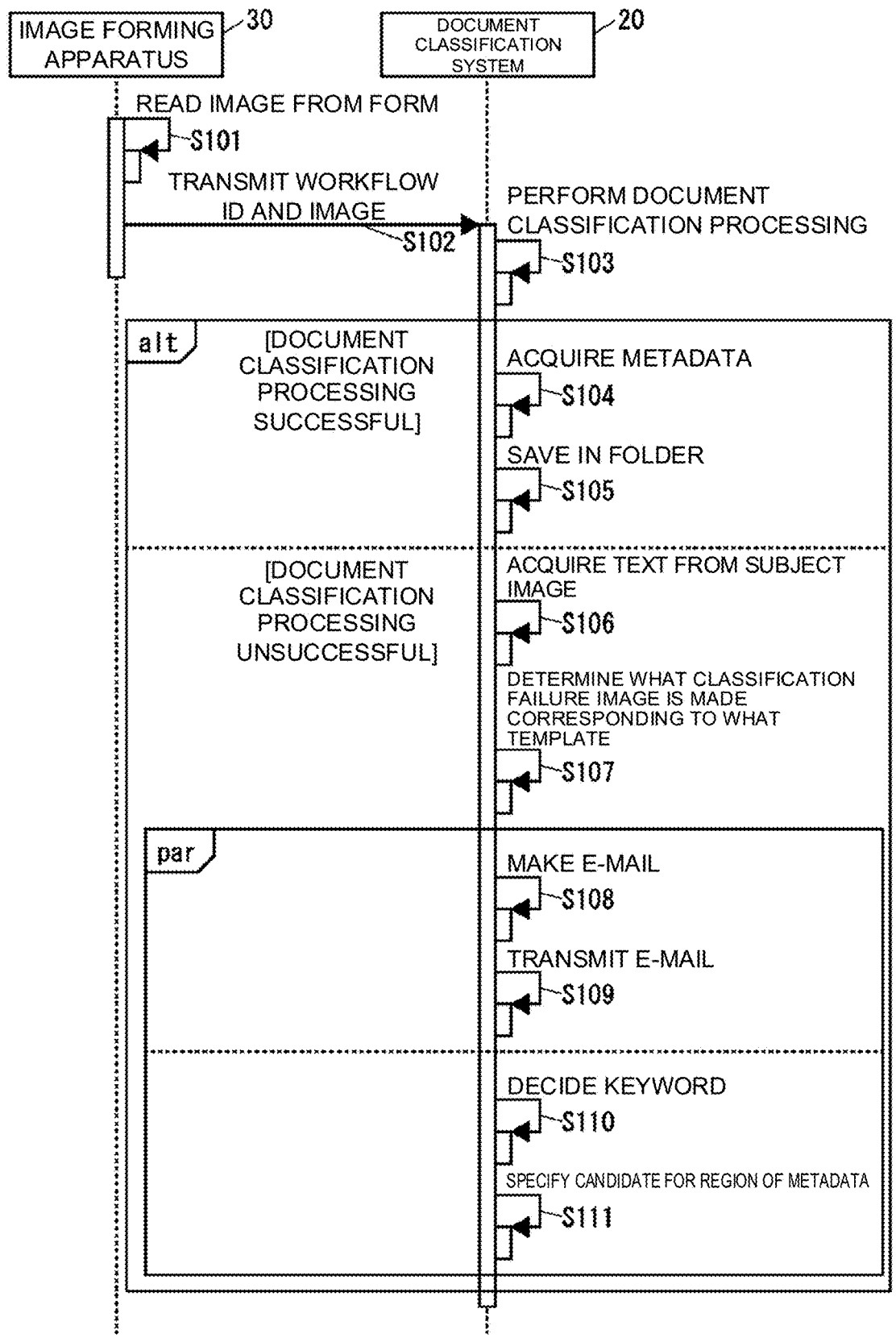
FIG. 6 is a sequence diagram of operations of the system illustrated in FIG. 1 when document classification processing is performed in a document classification system.

FIG. 6 is a sequence diagram of the operations of the system 10 when document classification processing is performed in the document classification system 20.

An operator can set at least one form on the scanner 34 of the image forming apparatus 30 as an original and instruct to execute one or another workflow stored in the document classification system 20 through the operation unit 31 of the image forming apparatus 30. A plurality of forms may be set on the scanner 34, while the forms each constitute a discrete document.

When an instruction to execute a workflow in the document classification system 20 is given through the operation unit 31, the controller 38 of the image forming apparatus 30 causes the scanner 34 to read one image from each form set on the scanner 34 (S101).

After the process in S101, the controller 38 transmits the workflow ID of the workflow, whose execution is instructed through the operation unit 31, and the images as read in S101 to the document classification system 20 (S102).

When receiving the workflow ID and the images transmitted from the image forming apparatus 30 in S102 (hereinafter, the workflow specified by the workflow ID transmitted in S102 being referred to as "subject workflow" and the images transmitted in S102 being referred to as "subject images"), the document classifier 25a of the document classification system 20 uses an image file in a template file specified by a template ID contained in the set template information in the subject workflow to perform document classification processing by supervised machine learning on each subject image (S103). The document classifier 25a may perform some preprocess for the document classification processing or for optical character recognition (OCR) before performing the document classification processing in S103. Examples of such preprocess include adjusting the orientation of a subject image appropriately to the document classification processing or the OCR and complementing, for the document classification processing or the OCR, an image of a character partially broken off in a subject image.

With respect to the subject image, on which the document classification processing is successfully performed in S103, the document classifier 25a acquires metadata from the subject image by zone OCR for performing OCR on part of an image, based on the data file in the template file, which is made corresponding to the subject image by the document classification processing in S103 among the template files specified by the template IDs contained in the set template information of the subject workflow (S104).

Then, the document classifier 25a associates the subject image, on which the document classification processing is successfully performed in S103, with the metadata acquired in S104 to save the subject image in a folder in the storage 24 (S105). In this regard, the document classifier 25a may decide, as a saving folder for the subject image, a folder corresponding to the template folder, to which the subject image is made corresponding by the document classification processing in S103, or a folder according to the metadata acquired in S104. If no folders according to the metadata acquired in S104 are present in the storage 24, the document classifier 25a may dynamically generate a folder according to the metadata acquired in S104. In addition, the document classifier 25a may dynamically generate the file name of the subject image to be saved in a folder according to the metadata acquired in S104. As an example, if the template file, to which the subject image is made corresponding by the document classification processing in S103, is a template file of a commercial invoice, the document classifier 25a may associate the subject image with the metadata acquired in S104 to save the subject image in a folder according to the vendor in the commercial invoice under a file name according to the invoice number in the commercial invoice, with the vendor and the invoice number being each involved in the metadata.

With respect to the subject image, on which the document classification processing is unsuccessfully performed in S103, namely, a classification failure image, the classification failure image reporter 25b of the document classification system 20 acquires text from the subject image by full OCR for performing OCR on the entire image (S106).

Then, based on an item of metadata contained in the data file in the template file, which is specified by the template ID contained in the set template information in the subject workflow, and the text acquired in S106, the classification failure image reporter 25b determines with a specified algorithm what classification failure image is made corresponding to what template file specified by the template ID contained in the set template information in the subject workflow (S107).

Subsequently, the classification failure image reporter 25b makes an electronic mail (hereinafter referred to as "e-mail") for each group of classification failure images determined in S107 to be made corresponding to one and the same template file (S108).

The classification failure image reporter 25b writes a uniform resource locator (URL) for causing the operator to create a new template file in the body of the e-mail made in S108. The URL written in the e-mail made in S108 varies from e-mail to e-mail.

The classification failure image reporter 25b may add a classification failure image to the e-mail made in S108 by attachment or insertion in the e-mail body. The classification failure image to be added to the e-mail made in S108 is an image with a primary object of causing the operator to ascertain whether or not the classification failure image is the image as intended by the operator to input in the document classification system 20. Therefore, the classification failure image reporter 25b may add only one specified classification failure image out of the classification failure images as the cause for the e-mail made in S108, such as the image, on which the document classification processing is unsuccessfully performed for the first time in the subject workflow.

After the process in S108, the classification failure image reporter 25b transmits the e-mail made in S108 to the contact address contained in the contact address information 24i (S109).

In parallel with the processes in S108 and S109 after the process in S107, the classification failure image reporter 25b decides a keyword for each classification failure image, based on an item of metadata contained in the data file in the template file, which is determined in S107 to be made corresponding to the relevant classification failure image (S110). In this regard, the classification failure image reporter 25b may decide a plurality of keywords for one classification failure image. If the template file as determined in S107 to be made corresponding to a classification failure image is a template file of a commercial invoice, the classification failure image reporter 25b may decide an item name of metadata contained in the data file in the template file, such as "vendor" or "invoice number," as a keyword.

After the process in S110, based on the keyword decided in S110, the classification failure image reporter 25b specifies, for each classification failure image, a candidate for the region of metadata that corresponds to the keyword in the relevant classification failure image (S111).

The classification failure image reporter 25b can specify a candidate for the region of metadata in S111 by various methods.

For instance, the classification failure image reporter 25b may initially search the classification failure image for the keyword decided in S110, then specify, in S111, a rectangular region surrounding a character string present on the periphery of the keyword in the classification failure image as a candidate for the region of metadata.

Alternatively, the classification failure image reporter 25b may search the classification failure image for a character string according to the keyword decided in S110 and specify, in S111, a rectangular region surrounding the character string as a candidate for the region of metadata. If the keyword decided in S110 is "invoice number," the classification failure image reporter 25b may search the classification failure image for a character string that is like an invoice number and specify a rectangular region surrounding the character string as a candidate for the region of metadata.

In S111, the classification failure image reporter 25b may specify a plurality of candidates for the region of metadata with respect to one keyword. For instance, the classification failure image reporter 25b may search the classification failure image for the keyword decided in S110 and specify, out of the rectangular regions each surrounding a character string present on the periphery of the keyword in the classification failure image, a specified number of rectangular regions with shorter distances to the keyword as candidates for the region of metadata.

It is also possible to set the controller 25 in advance not to execute the processes in S106 through S111.

The description below is made on the operations of the system 10 when a template editor is displayed on the user terminal 40.

Figure 7:
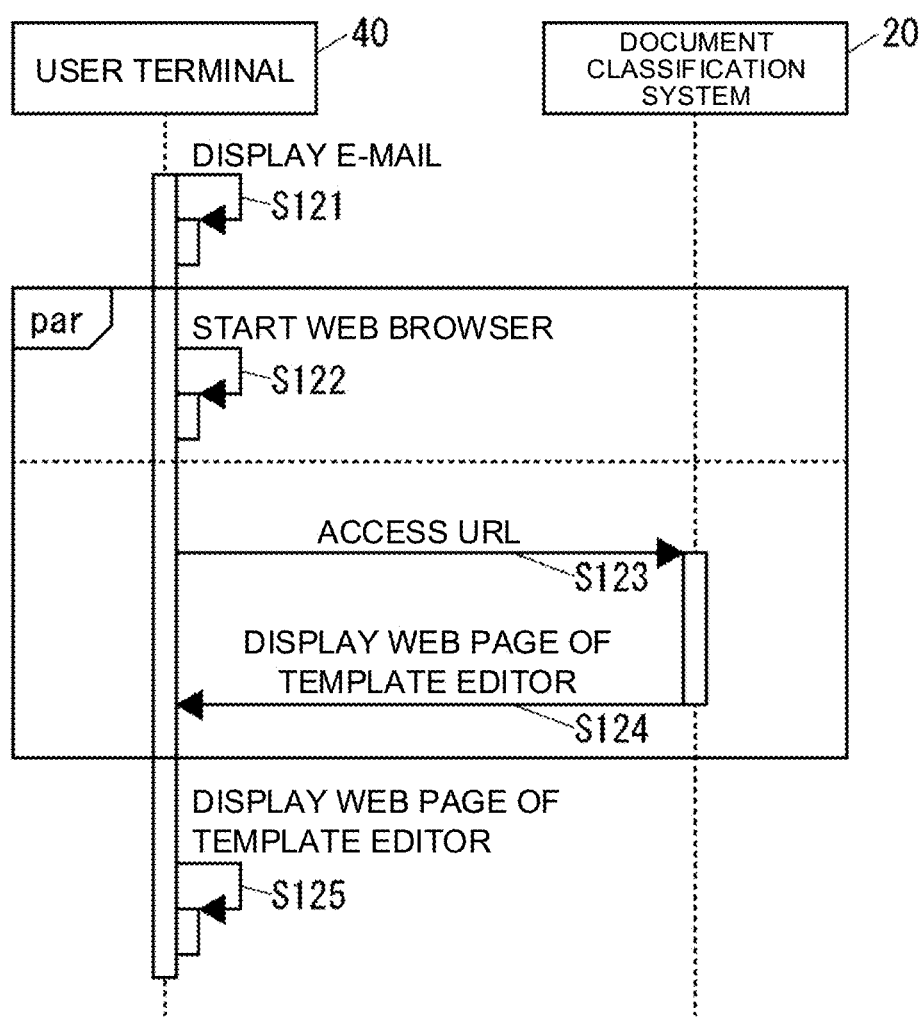
FIG. 7 is a sequence diagram of operations of the system illustrated in FIG. 1 when a template editor is displayed on a user terminal.

FIG. 7 is a sequence diagram of the operations of the system 10 when a template editor is displayed on the user terminal 40.

When receiving the e-mail transmitted by the document classification system 20 in S109, the controller 45 of the user terminal 40 displays the received e-mail on the display 42, as illustrated in FIG. 7 (S121). Therefore, the operator can click a URL written in the body of the e-mail displayed on the display 42 through the operation unit 41 of the user terminal 40.

When the URL written in the body of the e-mail displayed on the display 42 is clicked in S121, the controller 45 starts the web browser 45a (S122) and accesses the URL (S123).

When the URL is accessed in S123, the classification failure image reporter 25b of the document classification system 20 transmits, to the user terminal 40, a web page of a template editor with a classification failure image according to the URL opened (S124). On the web page transmitted in S124, the candidate for the region of metadata according to the URL, namely, the candidate specified in S111 is shown in the classification failure image.

Thus, the controller 45 of the user terminal 40 displays the web page transmitted from the document classification system 20 in S124, namely the web page of the template editor with the classification failure image opened, on the display 42 by the web browser 45a started in S122 (S125). In S125, the classification failure image as opened in the template editor has the candidate for the region of metadata shown therein, as described above.

Figure 8:
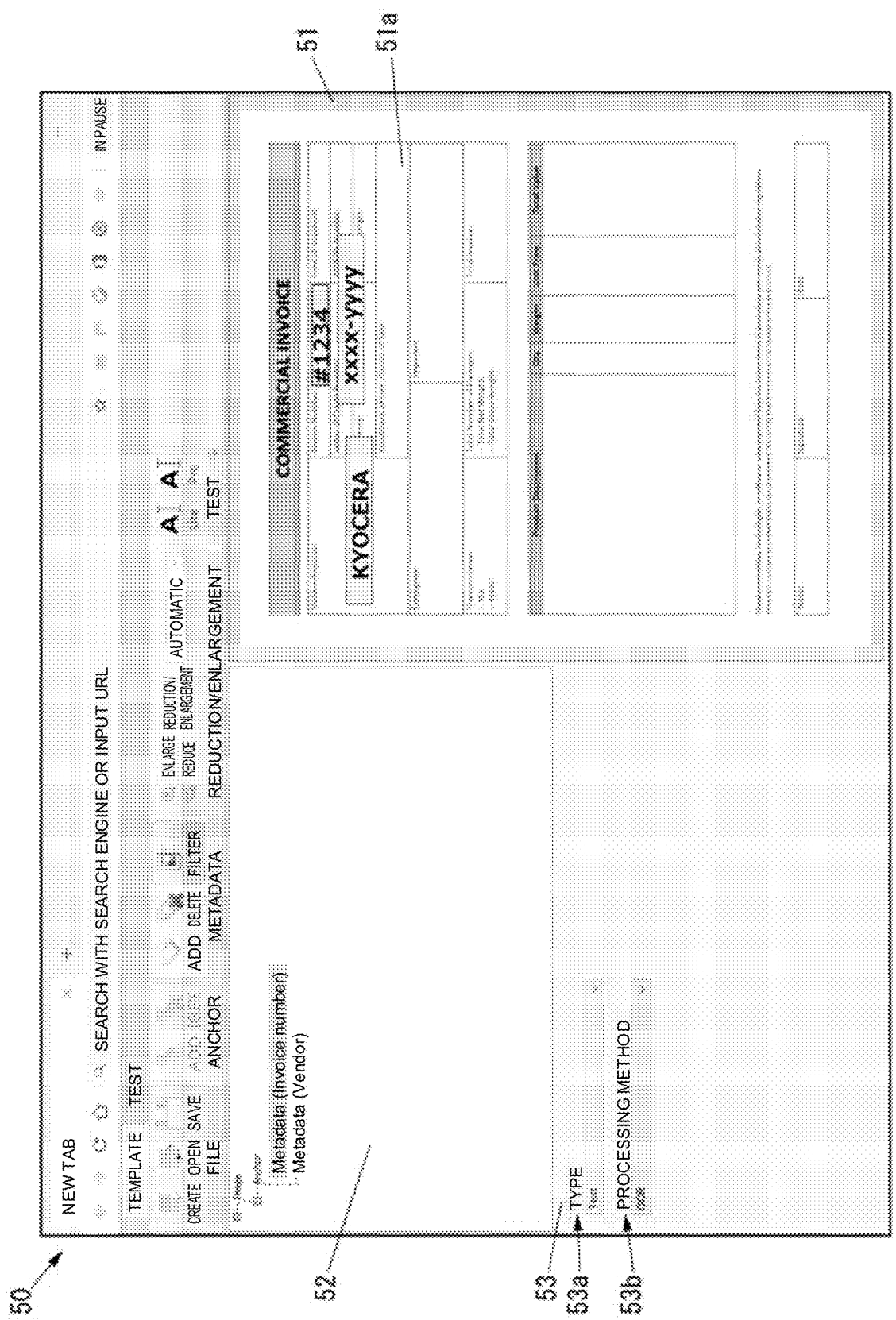
FIG. 8 is a diagram illustrating an exemplary screen of a web page of a template editor displayed on a display in FIG. 5.

FIG. 8 is a diagram illustrating an exemplary screen of the web page of the template editor displayed on the display 42.

A screen 50 illustrated in FIG. 8 includes an image display region 51, in which a classification failure image 51a is shown in order to accept designation of the region of metadata in the classification failure image 51a, an item designation region 52 for designating an item of metadata, and a setting designation region 53 for designating the settings of the metadata under the item designated in the item designation region 52.

In the example illustrated in FIG. 8, the classification failure image 51a shown in the image display region 51 is an image of a commercial invoice, in which regions of "#1234," "KYOCERA," and "xxxx-yyyy" are highlighted as candidates for the region of metadata.

In the example illustrated in FIG. 8, the items of metadata shown in the item designation region 52 are "invoice number" and "vendor," with the item "invoice number" being designated. If the item of metadata designated in the item designation region 52 is changed, the region of metadata designated in the image display region 51 is changed, accordingly.

In the setting designation region 53, a drop-down list 53a for designating the type of metadata and a drop-down list 53b for designating the method of processing metadata are shown. On the drop-down list 53a, "Text," "Number," "Decimal point" or the like can be designated. On the drop-down list 53b, "OCR," "Intelligent character recognition (ICR)," "Optical mark recognition (OMR)" or the like can be designated. In the example illustrated in FIG. 8, "Text" is designated on the drop-down list 53a and "OCR" is designated on the drop-down list 53b.

The operator can designate an appropriate region of metadata by deleting, through the operation unit 41, the candidates for the region of metadata other than the appropriate candidate. If there are no appropriate candidates for the region of metadata among those shown in the image display region 51, the operator can manually set an appropriate region of metadata with respect to the classification failure image 51a shown in the image display region 51 through the operation unit 41.

The operator can add or delete an item of metadata shown in the item designation region 52 by an operation through the operation unit 41.

If the classification failure image according to the URL accessed in S123 is two or more in number, the operator can change the classification failure images from one to another on the screen 50 by an operation through the operation unit 41.

Next, description is made on the operations of the system 10 when a template file is added.

FIG. 9 is a sequence diagram of the operations of the system 10 when a template file is added.

After the designation of the region of metadata on the web page of the template editor displayed on the display 42 of the user terminal 40 in S125, the operator can instruct the saving of the template file through the operation unit 41.

When the saving of the template file is instructed, the controller 45 of the user terminal 40 associates the template file, whose saving is instructed, with the classification failure image corresponding to the template file to transmit the template file as such to the document classification system 20, as illustrated in FIG. 9 (S141). The template file, whose saving is instructed, includes a data file that contains the region of metadata as designated in the image display region 51 on the screen 50 and the item of metadata as designated in the item designation region 52, with the designated item corresponding to the designated region, and an image file that is a file of the classification failure image 51a as shown in the image display region 51.

When receiving the template file transmitted from the user terminal 40 in S141, the template acceptor 25c of the document classification system 20 stores the received template file in the storage 24 (S142). Consequently, the template file can be set on an optional workflow to be executed by the document classification system 20.

After the process in S142, the document classifier 25a of the document classification system 20 acquires metadata from the classification failure image, which is associated with the template file stored in the storage 24 in S142, based on the template file (S143).

If no errors have occurred in the process in S143, that is to say, if the acquirement of metadata in S143 is successful, the document classifier 25a associates the classification failure image, which is associated with the template file transmitted from the user terminal 40 in S141, with the metadata acquired in S143 to save the classification failure image as such in a folder in the storage 24, as is the case with the process in S105 (S144).

Then, the document classifier 25a adds the template file ID of the template file transmitted from the user terminal 40 in S141 to the set template information in the subject workflow (S145).

If some error has occurred in the process in S143, that is to say, the acquirement of metadata in S143 is unsuccessful, the document classifier 25a doses not execute the process in S144 through S145.

As described above, the document classification system 20 reports a classification failure image (S108, S109, and S124). In consequence, the operator does not need to visually check a group of original documents one by one based on the results of the processing performed by the document classification system 20, such as the order in the group of the original document as not properly classified, which leads to the reduction in operation time.

The document classification system 20 reports the screen 50 showing a classification failure image (S124) and accepts a template file that includes a data file containing the region of metadata and the item of metadata corresponding to the region of metadata, both designated on the screen 50, and an image file as a file of the classification failure image shown on the screen 50 (S142), so that the creation of a template file based on a classification failure image is facilitated, leading to the reduction in operation time.

The document classification system 20 specifies a candidate for the region of metadata in a classification failure image (S111) and shows the specified candidate on the screen 50 showing the classification failure image (S124), which facilitates the creation of a template file based on a classification failure image and, as a result, reduces the operation time.

When accepting a template file that is created based on a classification failure image, the document classification system 20 uses the data file included in the template file to automatically acquire metadata from the classification failure image by OCR (S143), so that the acquirement of metadata from a classification failure image is facilitated, leading to the reduction in operation time.

When accepting a template file that is created based on a classification failure image and using the data file included in the template file to automatically acquire metadata from the classification failure image by OCR, the document classification system 20 automatically sets the template file on a workflow if the acquirement of metadata is successful (S145). In consequence, the setting of a template file on a workflow is facilitated and the operation time is reduced.

In the embodiment as described above, images are input to the document classification system 20 from an image forming apparatus. The document classification system 20, however, may have such a configuration that images are input from an input unit other than the image forming apparatus, such as a pre-designated folder, a web browser or a mobile terminal.

In the embodiment as above, the document classification system 20 outputs images to a folder. The document classification system 20 may also output images to an output destination other than the folder, such as an online storage service or an e-mail.

In the embodiment as above, the document classification system 20 makes, for each group of classification failure images, an e-mail for causing an operator to newly create a template file. The document classification system 20 may make an e-mail for causing an operator to newly create a template file for each subject workflow or each classification failure image.

In the embodiment as above, the document classification system 20 gives a report for causing an operator to newly create a template file by e-mail. The document classification system 20 may give a report for causing an operator to newly create a template file by a reporting means other than e-mail, such as a chat tool.

What is claimed is:

1. A document classification system comprising:
   a document classifier that uses a template file including an image file, which is a file of a model image for classifying a document, to classify the document by machine learning;
   a classification failure image reporter that transmits, to a user, a notification of a classification failure image, which is an image of the document when the document is unsuccessfully classified by the document classifier, the notification including information to cause the user to create a template file; and
   a template acceptor that accepts the template file formed in accordance with the notification transmitted by the classification failure image reporter,
   wherein the template file includes a data file, which contains an item of metadata of an image and a region of the metadata in the image,
   wherein the document classifier uses the image file included in the template file to classify the document by machine learning, and uses the data file included in the template file to acquire the metadata from the image of the document by optical character recognition,
   wherein the classification failure image reporter reports a screen, on which the classification failure image is shown so that the user designates the region in the classification failure image, and
   wherein the template acceptor accepts the template file including the data file, which contains the region designated on the screen and the item corresponding to the region, and the image file, which is a file of the classification failure image shown on the screen.

2. The document classification system according to claim 1,
   wherein the document classifier executes a workflow, on which the template file is set, uses the image file included in the template file set on the workflow to classify the document by machine learning, and uses the image file included in the template file to acquire the metadata from the image of the document by optical character recognition, and
   wherein the classification failure image reporter specifies, based on text obtained from the classification failure image by optical character recognition and the item contained in the data file included in the template file set on the workflow, a candidate for the region corresponding to the item in the classification failure image and shows the candidate specified on the screen.

3. The document classification system according to claim 1, wherein, when the template file is accepted by the template acceptor, the document classifier uses the data file included in the template file to automatically acquire the metadata from the classification failure image by optical character recognition.

4. The document classification system according to claim 2, wherein, when the template file is accepted by the template acceptor, the document classifier uses the data file included in the template file to automatically acquire the metadata from the classification failure image by optical character recognition and, when the metadata is successfully acquired, automatically set the template file on the workflow.

5. A non-transitory computer readable recording medium storing a document classification program, the document classification program causing a computer to implement:
   a document classifier that uses a template file including an image file, which is a file of a model image for classifying a document, to classify the document by machine learning;
   a classification failure image reporter that transmits, to a user, a notification of a classification failure image, which is an image of the document when the document is unsuccessfully classified by the document classifier, the notification including information to cause the user to create a template file; and
   a template acceptor that accepts the template file formed in accordance with the notification transmitted by the classification failure image reporter,
   wherein the template file includes a data file, which contains an item of metadata of an image and a region of the metadata in the image,
   wherein the document classifier uses the image file included in the template file to classify the document by machine learning, and uses the data file included in the template file to acquire the metadata from the image of the document by optical character recognition,
   wherein the classification failure image reporter reports a screen, on which the classification failure image is shown so that the user designates the region in the classification failure image, and
   wherein the template acceptor accepts the template file including the data file, which contains the region designated on the screen and the item corresponding to the region, and the image file, which is a file of the classification failure image shown on the screen.

6. The document classification system according to claim 2, wherein the information included in the notification includes information for obtaining a template editor for forming the template file from the document classification system.

7. The non-transitory computer readable recording medium according to claim 5, wherein the information included in the notification includes information for obtaining a template editor for forming the template file from a document classification system.

* * * * *